United States Patent
Haesendonckx et al.

(10) Patent No.: US 10,668,660 B2
(45) Date of Patent: Jun. 2, 2020

(54) METHOD FOR PRODUCING CONTAINERS FILLED WITH A LIQUID FILLING MATERIAL FROM BLANKS MADE OF A THERMOPLASTIC MATERIAL AND NOZZLE FOR USE IN SUCH A METHOD

(71) Applicant: KHS CORPOPLAST GMBH, Hamburg (DE)

(72) Inventors: Frank Haesendonckx, Hamburg (DE); Dieter Klatt, Hamburg (DE)

(73) Assignee: KHS CORPOPLAST GMBH, Hamburg (DE)

( * ) Notice: Subject to any disclaimer, the term of this patent is extended or adjusted under 35 U.S.C. 154(b) by 414 days.

(21) Appl. No.: 14/900,591

(22) PCT Filed: Jun. 20, 2014

(86) PCT No.: PCT/EP2014/001681
§ 371 (c)(1),
(2) Date: Apr. 11, 2016

(87) PCT Pub. No.: WO2014/202224
PCT Pub. Date: Dec. 24, 2014

(65) Prior Publication Data
US 2016/0221247 A1    Aug. 4, 2016

(30) Foreign Application Priority Data

Jun. 20, 2013 (DE) .................. 10 2013 010 207
Feb. 18, 2014 (DE) .................. 10 2014 002 052

(51) Int. Cl.
*B29C 49/46*    (2006.01)
*B29C 49/58*    (2006.01)
*B29C 49/78*    (2006.01)
*B29C 49/16*    (2006.01)
*B05B 15/656*   (2018.01)
*B29C 49/06*    (2006.01)
(Continued)

(52) U.S. Cl.
CPC ............ *B29C 49/46* (2013.01); *B05B 15/656* (2018.02); *B29C 49/16* (2013.01); *B29C 49/58* (2013.01);
(Continued)

(58) Field of Classification Search
None
See application file for complete search history.

(56) References Cited

U.S. PATENT DOCUMENTS 4,058,870 A    11/1977    Goodwin
5,052,626 A    10/1991    Wood
(Continued)

FOREIGN PATENT DOCUMENTS

CN    1131924 A    9/1996
DE    202008005393 U1    7/2008
(Continued)

*Primary Examiner* — Robert J Grun
(74) *Attorney, Agent, or Firm* — Lucas & Mercanti, LLP; Klaus P. Stoffel (57) ABSTRACT

A method for producing containers filled with a liquid filling material from blanks made of a thermoplastic material and to a nozzle for use in the method. In the method, each blank is at least thermally conditioned and is then shaped to form the container in a mold during a shaping phase, by axial and radial stretching, as a result of liquid filling material being introduced under pressure into the blank through a nozzle. The axial stretching is initiated by the pulsed injection of filling material into the blank.

25 Claims, 6 Drawing Sheets

(51) Int. Cl.
*B29C 49/14* (2006.01)
*B05B 1/14* (2006.01)
*B29K 101/12* (2006.01)
*B29L 31/00* (2006.01)

(52) U.S. Cl.
CPC .............. *B29C 49/783* (2013.01); *B05B 1/14* (2013.01); *B29C 49/06* (2013.01); *B29C 49/14* (2013.01); *B29C 2049/465* (2013.01); *B29C 2049/4664* (2013.01); *B29C 2049/5803* (2013.01); *B29C 2049/5896* (2013.01); *B29C 2949/7805* (2013.01); *B29C 2949/78386* (2013.01); *B29C 2949/78487* (2013.01); *B29C 2949/78537* (2013.01); *B29K 2101/12* (2013.01); *B29L 2031/7158* (2013.01)

(56) References Cited

U.S. PATENT DOCUMENTS

| | | | |
|---|---|---|---|
| 5,622,735 | A | 4/1997 | Krishnakumar |
| 7,972,554 | B2 | 7/2011 | Leone |
| 8,968,636 | B2 | 3/2015 | Eberle |
| 9,254,617 | B2 | 2/2016 | Maki |
| 10,457,426 | B2 | 10/2019 | Drenguis |
| 2002/0171161 | A1 | 11/2002 | Belcher |
| 2010/0090025 | A1 | 4/2010 | Gerard et al. |
| 2011/0011489 | A1 | 1/2011 | Meinzinger |
| 2011/0189332 | A1 | 8/2011 | Leone |
| 2012/0299224 | A1 | 11/2012 | Cooper et al. |
| 2013/0147097 | A1* | 6/2013 | Lane .................. B29C 49/0073 264/524 |

FOREIGN PATENT DOCUMENTS

| | | |
|---|---|---|
| DE | 102008050027 A1 | 4/2009 |
| DE | 102009033557 A1 | 1/2011 |
| DE | 102011012664 A1 | 8/2012 |
| DE | 102011015666 A1 | 10/2012 |
| WO | 9950047 A1 | 10/1999 |
| WO | 2012051365 A2 | 4/2012 |
| WO | 2012156014 A | 11/2012 |
| WO | 2013063453 A1 | 5/2013 |

* cited by examiner

METHOD FOR PRODUCING CONTAINERS FILLED WITH A LIQUID FILLING MATERIAL FROM BLANKS MADE OF A THERMOPLASTIC MATERIAL AND NOZZLE FOR USE IN SUCH A METHOD

The present application is a 371 of International application PCT/EP2014/001681, filed Jun. 20, 2014, which claims priority of DE 10 2013 010 207.3, filed Jun. 20, 2013, and DE 10 2014 002 052.5, filed Feb. 18, 2014, the priority of these applications is hereby claimed and these applications are incorporated herein by reference.

BACKGROUND OF THE INVENTION

Methods are known from prior art in which a container, in particular a bottle, is produced from a blank made of plastic. For this purpose, the blank is at least thermally conditioned and is then shaped hydraulically to form the container in a mould during a shaping phase, as a result of a liquid pressurized material being introduced into the blank while the blank is axially and radially stretched.

In most known methods, a so-called stretch rod is used for axial stretching which is introduced into the blank through the mouth of the blank which later represents the container opening. Using the stretch rod, a mechanical force is exerted on the base of the blank such that the thermally conditioned blank is stretched axially. The greatest force is thereby required for initiating the stretching procedure. It is important to initiate the axial stretching in a controlled manner such that the future container is formed evenly and the wall thickness reaches the desired values.

The use of a stretch rod during the hydraulic shaping with liquid filling material, however, has the disadvantage that the stretch rod must be immersed in the filling material and filling material always remains on the stretch rod on removal from the filled container which can contaminate the filling machine or the container outer sides. In particular in the case of liquids containing sugar or the partial filling of the container with syrup, this leads to contamination which must be avoided.

A method is known from DE 10 2011 015 666 A1 in which a guiding and shaping device engages with the blank from the outside during the stretching. It is thereby difficult to transfer the tensile forces required to initiate the stretching to the blank such that these forces must be applied primarily from the inside by the exertion of pressure of the filling material flowing in. However, the force acting radially and axially can thereby not be differentiated between such that the initiation of the axial stretching is problematic.

SUMMARY OF THE INVENTION

The object of the invention is to provide a method for the controlled shaping of a blank into a container in which contamination of the container outer side or of the filling machine by filling material dripping from the stretch rod is prevented.

To solve the object, a method for producing containers filled with a liquid filling material from blanks made of a thermoplastic material is proposed, wherein the respective blank is at least thermally conditioned and is then shaped in a mould during a shaping phase to form the container, as a result of liquid filling material being introduced under pressure into the blank through a nozzle, while the blank is axially and radially stretched, which is characterized in that the axial stretching is initiated by the pulsed injection of filling material into the blank.

In the context of this application, the axial direction is to be understood as the direction at a right angle to the mouth of the blank. Usually, the blank will have its greatest length in this direction and, with the exception of possible threads around its mouth, will have an axis of symmetry. The radial direction is to be understood as any direction at a right angle to the axial direction.

According to the invention, the liquid medium is supplied by the pulsed injection into a thermally pre-conditioned blank such that the axial stretching procedure is initiated. Supply of the pressurized medium by pulsed injection is understood to be a supply which occurs directly into the empty blank and the jet diameter and supply speed thereof are suitable to transfer a pulse on striking the blank and therefore to trigger the stretching procedure.

The supply of the filling material preferably occurs in the axial direction of the blank such that the complete pulse of the filling material jet striking in the blank is available for the axial stretching.

The diameter and the speed of the filling material jet conforms to the force required for the initiation of the stretching of the blank and therefore depends on the material used, the geometry of the blank and furthermore the thermal conditioning.

The pulse transferred by the filling material jet striking in the blank therefore replaces the stretch rod. The jet preferably strikes the central region of the base of the blank in a targeted manner. Usual blanks have a rounded crest in this region. The largest region of the jet should preferably occur in the region of the crest which is approximately at a right angle to the jet direction such that as great a pulse as possible can be transferred in the axial direction.

In the case of the use of a stretch rod according to prior art, usual stretching forces lie between 400N and 600N. In order to achieve comparable results between 350N and 650N with a filling material jet, the jet diameter must lie between 3 and 20 mm and the flow speed between 30 and 100 m/s. The precise values also depend on the filling material used.

The supply speed and/or the jet diameter can be changed in the course of the filling and shaping procedure. In particular, the filling and shaping procedure can begin with a high supply speed in order to achieve a large pulse for the initiation of the stretching procedure. In the course of the filling and shaping procedure, the supply speed can then be reduced in order to enable a controlled axial and radial shaping of the container. Likewise, the jet diameter of the filling material can be changed in the course of the filling and shaping procedure. The jet diameter can, for example, in the case of a high supply speed, firstly be selected to be small in order to achieve a high axial pulse transfer in the central region of the base of the blank, and can then be increased in order to achieve a high filling rate. Conversely, a very broad jet can firstly also flow into the blank in order to provide a high mass flow for pulse transfer, which is then decreased for the further filling procedure.

The axial stretching of the blank can be guided by a guiding device engaging with the blank from the outside. The guiding device can, in particular, partially surround the blank or can be arranged to engage or interlock with the blank. The axial stretching procedure can thereby take place in a controlled manner and the pressure of the filling material flowing into the blank can be used for the axial or radial stretching. For this purpose, the axial stretching speed of the blank can be limited at least temporarily.

A process is conceivable, for example, in which a high initial pulse is transferred to the blank through the filling material flowing into the blank in a pulsed injection and the stretching procedure is thereby triggered. After a first axial stretching, the guiding device limits the speed of the axial stretching and at the same time guides the blank being shaped in order to ensure a symmetrical formation of the container. The pressure of the filling material flowing into the blank can then, depending on the degree of the limitation of the axial stretching, be converted more or less into the radial stretching.

Conversely, a support of the axial stretching by the guiding device is also possible. For this, the guiding device is preferably arranged in an engaging manner on the blank and can transfer tensile forces to the blank in the axial direction.

According to one embodiment of the present invention, the nozzle can be moved axially during the shaping procedure. Advantageously, the distance between the base of the blank and the nozzle is thereby controlled, in particular in such a way that, at least temporarily, a defined distance is observed, for example a certain minimum or a certain maximum distance from the base of the blank which moves in the axial direction during the shaping process. A precise and controlled pulse transfer to the blank can thereby be achieved and the stretching procedure can be controlled precisely. The position of the base of the blank can thereby be detected during the shaping process, in particular inductively, using ultrasound or by detecting the thermal profile.

The position of the nozzle during the shaping procedure can also be controlled by means of pressure values which are detected during the shaping procedure, in particular the pressure of the filling material, the pressure in an exhaust air duct or the pressure in a return flow line, through which a partial flow of the filling material is guided back as a measurement flow.

The temperature of the filling material can be controlled during the shaping and filling procedure, wherein the filling material can in particular be heated. By influencing the temperature of the blank which is already thermally conditioned before the beginning of the shaping process, the stretching process can be influenced and controlled. Due to high filling material temperatures, the blank is deformed more easily. Due to a change of the filling material temperature during the process, certain sections of the blank can be stretched more heavily or less heavily.

To prevent the lateral deviation of the nozzle during the shaping process, in particular in the case of an axially displaceable nozzle, the nozzle can be at least temporarily radially supported during the shaping process. This can occur using lateral guide elements on the nozzle or in the region of the nozzle which are supported laterally in the radial direction on the surface of the blank. In particular, the support can occur by filling material jets leaving the nozzle laterally in the radial direction, said filling material jets causing a stabilisation of the nozzle in the axial direction due to the resulting forces of the filling material flowing out. For this purpose, lateral openings for auxiliary jets can be provided on the nozzle, for example as individual openings or in the form of an annular gap.

The cross-sectional surface of the nozzle head can correspond approximately to the inner cross-sectional surface of the blank. At the beginning of the shaping process, a liquid cushion thereby arises which enables a particularly good pulse transfer between the liquid flowing in and the blank and triggers the stretching procedure in the axial direction.

One exemplary embodiment of the invention is explained in more detail below by means of the enclosed figures, which depict the following:

DETAILED DESCRIPTION OF THE INVENTION

Figure 1:
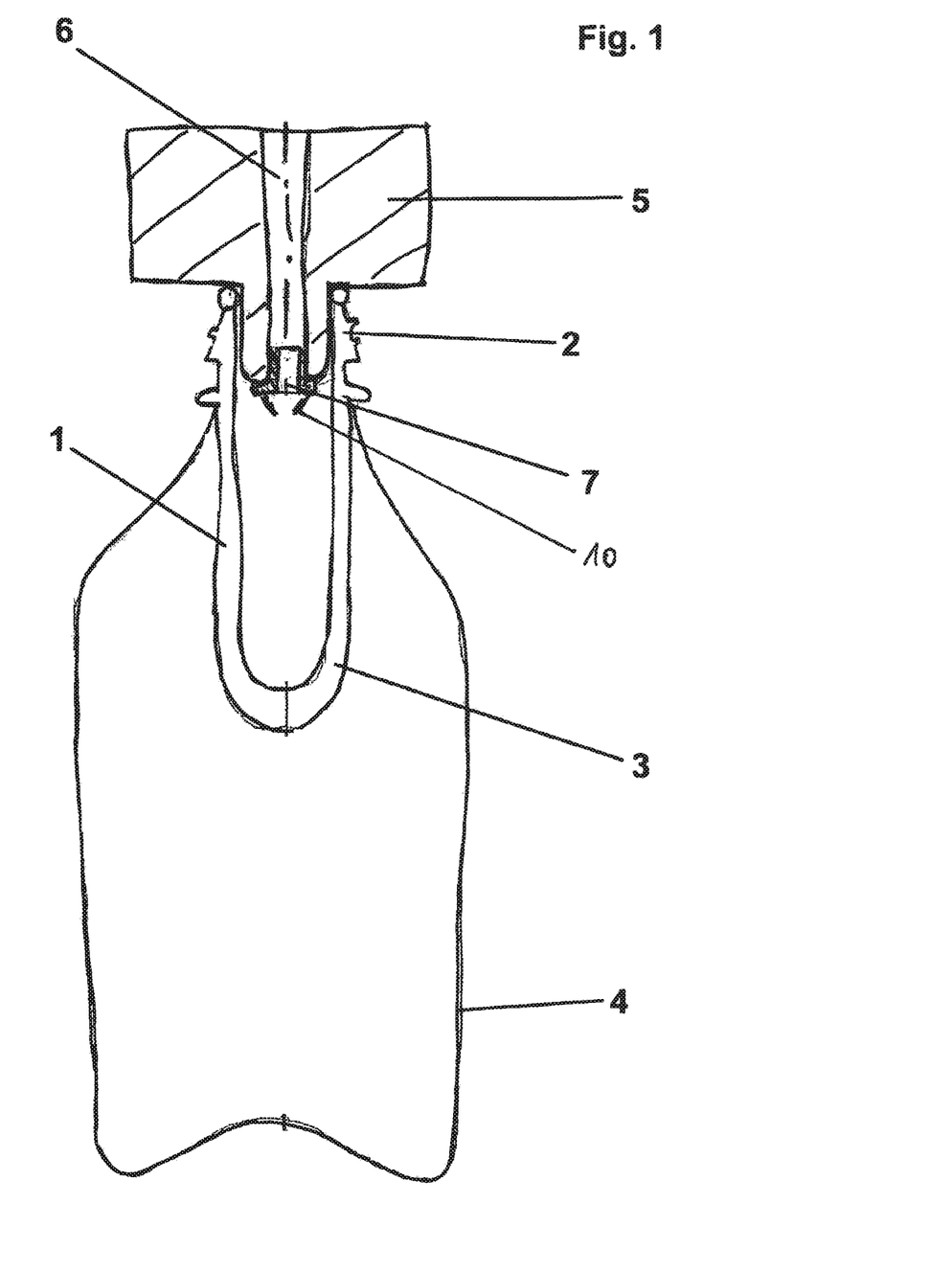
FIG. 1 shows a blank in a mould.

In FIG. 1, a blank 1 is depicted which has a mouth 2 and a rotationally symmetrical body 3. The blank 1 is located in a mould 4. The blank 1 is shaped hydraulically in a filling machine, which is not depicted, by introducing a liquid filling material, and is filled at the same time.

For this purpose, the filling head 5 of a filling machine is set in a sealing manner on the mouth 2 of the blank 1. The filling head 5 is provided with a supply line 6 for the liquid filling material, which can be opened and closed by a throttle valve 7 such that the filling material can be introduced into the interior of the blank 1 through a nozzle 10.

Figure 2:
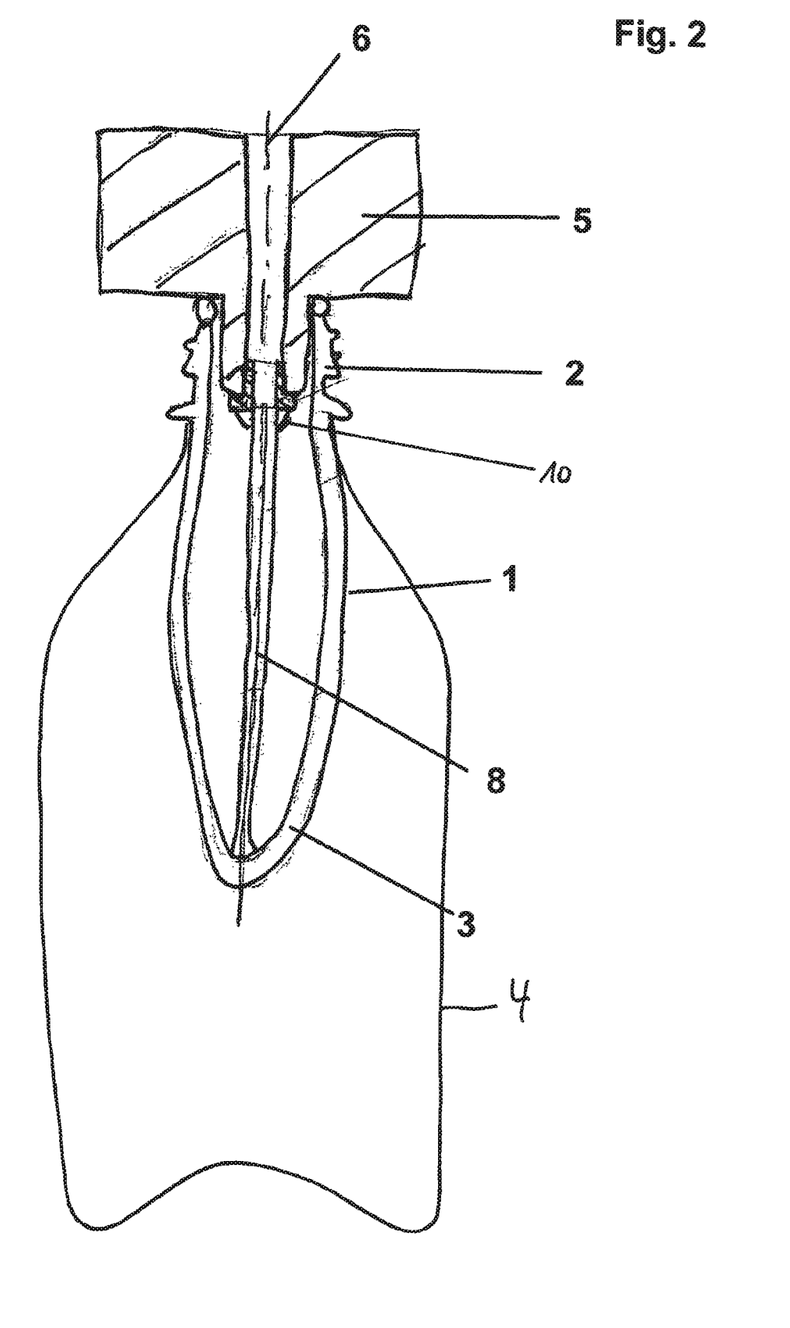
FIG. 2 shows a blank in the phase of the initiation of the stretching by a pulse jet.

The shaping and filling procedure of the container is then, as depicted in FIG. 2, initiated by a pulse jet of the filling material 8. The filling material 8 is introduced into the blank 1 at high speed. The blank 1 is thereby axially stretched. By further filling material 8 flowing in, the shaping of the container occurs within the mould 4.

The pulse jet thereby replaces the stretch rod. The jet diameter is measured such that the jet substantially strikes the central region of the base of the blank and transfers a pulse in the axial direction of the blank.

During use of usual blanks, a force of 400-600 N is required for the initiation of the stretching. In the depicted exemplary embodiment, water is used as a filling material 8. The jet exerts a stretching force on the base of the blank which depends on the mass and the speed of the jet. The mass of the jet can be influenced by the diameter. The exerted stretching force can therefore be controlled via the jet diameter and the jet speed. In the case of a jet with a 10 mm diameter, at a jet speed of 70 m/s, a stretching force of 385 N results, and at 90 m/s, a stretching force of 635 N, according to the formula:

$$F = \text{density} \times \text{jet cross-section} \times \text{supply speed}^2$$

In the process phase depicted in FIG. 2, the blank 1 has undergone a first axial and radial stretching.

Figure 3:
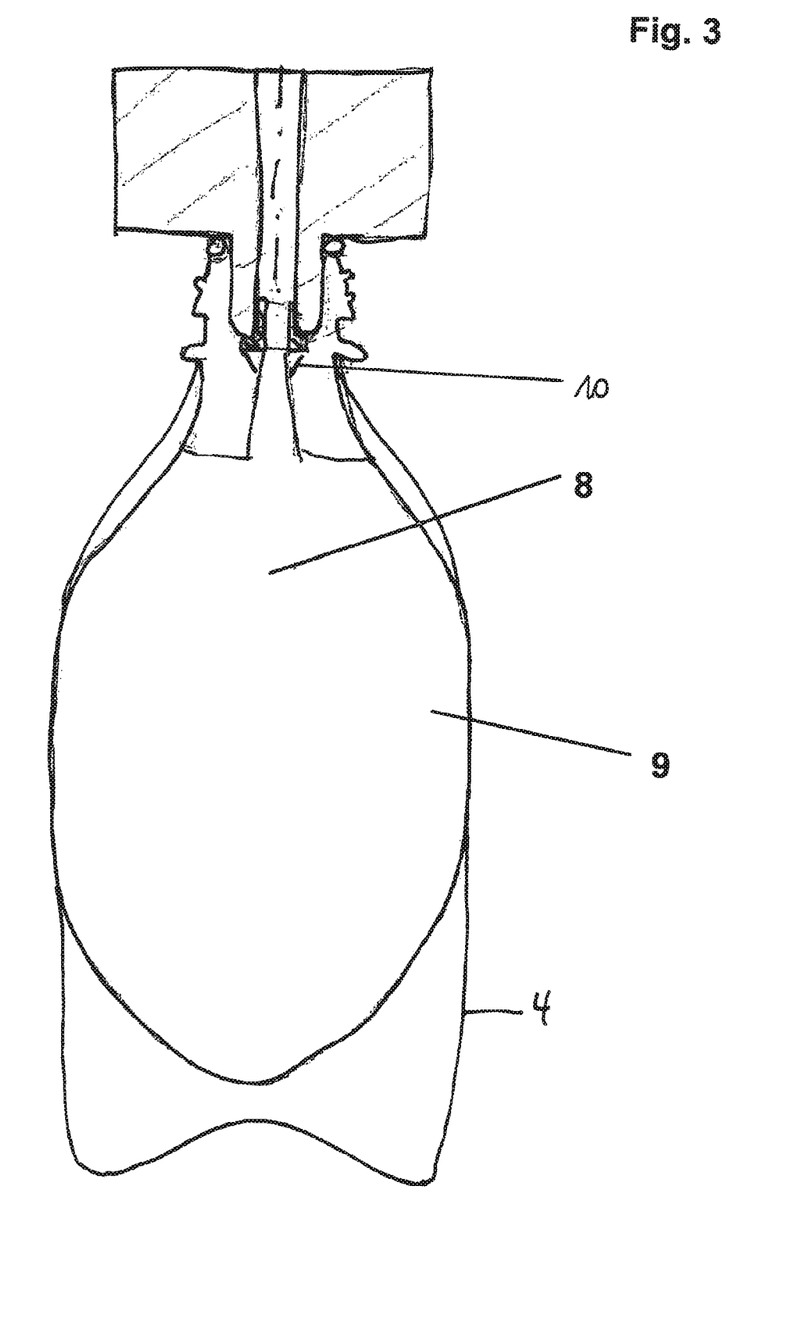
FIG. 3 shows a container being formed from a blank.

In FIG. 3, the shaping of the container 9 is progressed further. The axial and radial stretching occurs hydraulically by the effect of pressure of the filling material 8 supplied under pressure, wherein the container 9 extends in perimeter with increasing level of filling. In the course of the filling procedure, the supply speed of the filling material can be changed and in particular reduced.

Figure 4:
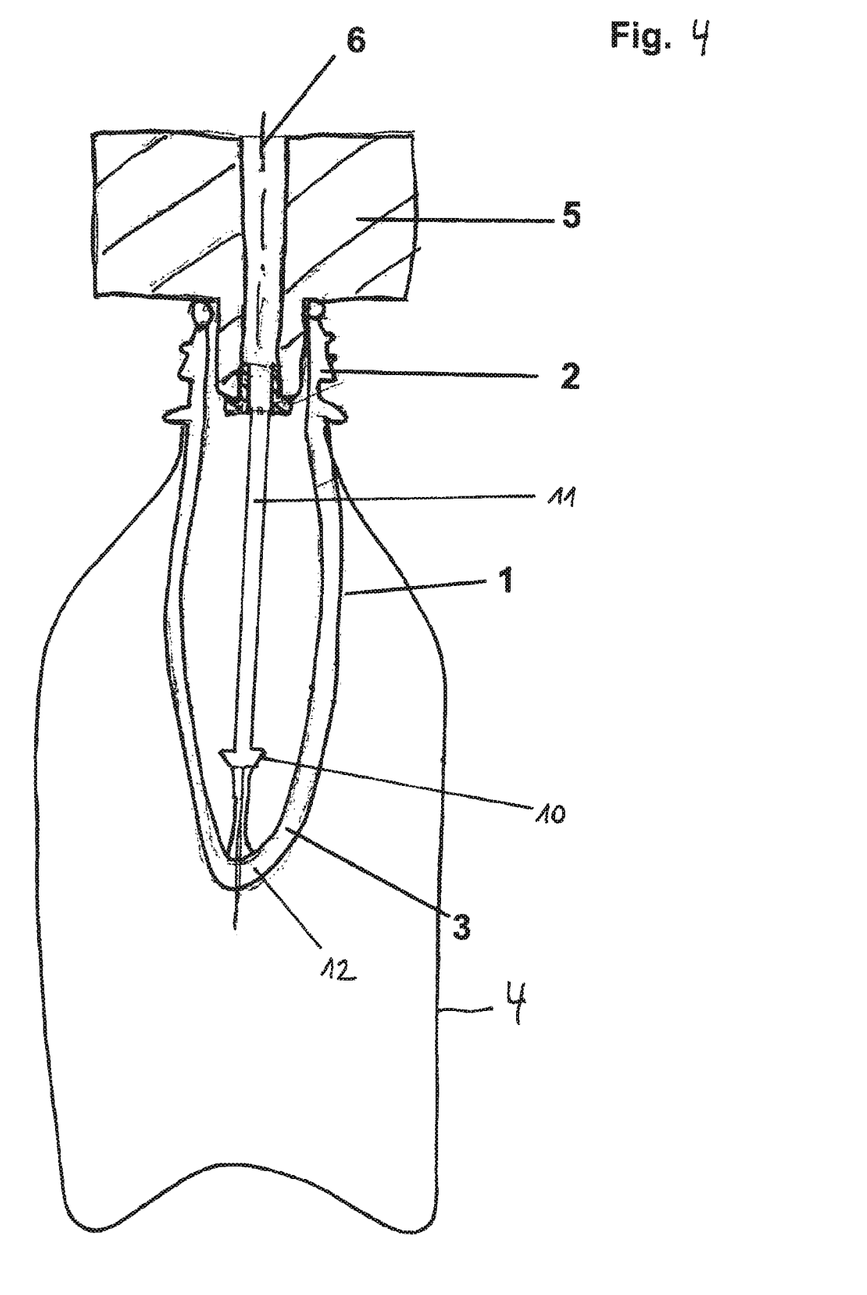
FIG. 4 shows a blank in the phase of the initiation of the stretching by a pulse jet with an accompanying nozzle.

FIG. 4 shows a blank 1 in the phase of the initiation of the stretching by a pulse jet, as also depicted in FIG. 2, but using a movable nozzle 10. In the depicted process phase, the blank 1 has undergone a first axial and radial stretching. The nozzle 10 is arranged on a moveable lance 11 and can be moved in the axial direction during the filling and shaping process. The axial stretching procedure can thereby be controlled in that the distance between the nozzle 10 and the base 12 of the blank is kept to a predetermined distance between the base 12 of the blank 1 and the nozzle 10 during the entire shaping and filling process or only temporarily, depending on the material of the blank 1 and the desired shape of the container. The exact position of the base 12 of the blank 1 can thereby be determined inductively, using ultrasound or by detecting the thermal profile during the shaping and filling process, and the position of the nozzle 10 can be controlled accordingly.

The pulse transfer can, in this exemplary embodiment, occur very reliably as the distance between the nozzle 10 and the base 12 of the blank 1 is small. The jet diverges slightly at the short distance until it strikes the base 12 of the blank 1. Through suitable selection of the jet diameter, the pulse transfer can occur in a defined region of the base 12 of the blank 1 and the stretching procedure is initiated in a controlled manner also without use of a stretch rod.

Figure 5:
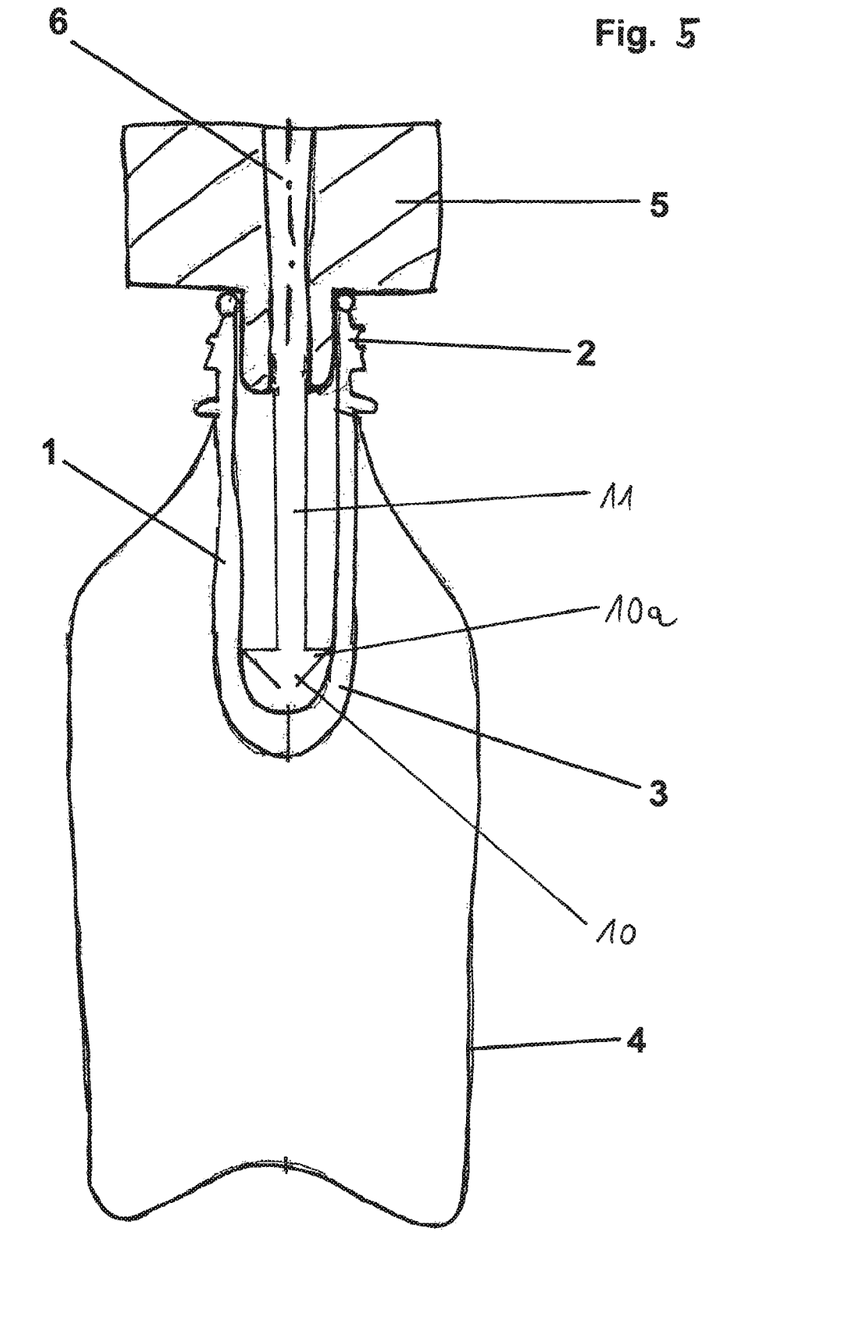
FIG. 5 shows a blank in a mould having a preferred embodiment of the nozzle head.

In FIG. 5, a blank 1 is depicted in a mould 4 with connected mould head 5 before the beginning of the shaping and filling procedure. Unlike the embodiment depicted in FIG. 1, the nozzle 10 is fastened to a moveable lance 11 and is moved in proximity of the base 12 of the blank 1. The cross-sectional surface of the nozzle head 10a corresponds approximately to the cross-sectional surface of the interior of the blank. A shielding against the interior of the blank 1 lying over the nozzle 10 is thereby achieved such that the pulse is transferred through the filling material from the nozzle 10 which strikes the base 12 of the blank in an optimum manner, and triggers the stretching procedure.

Figure 6:
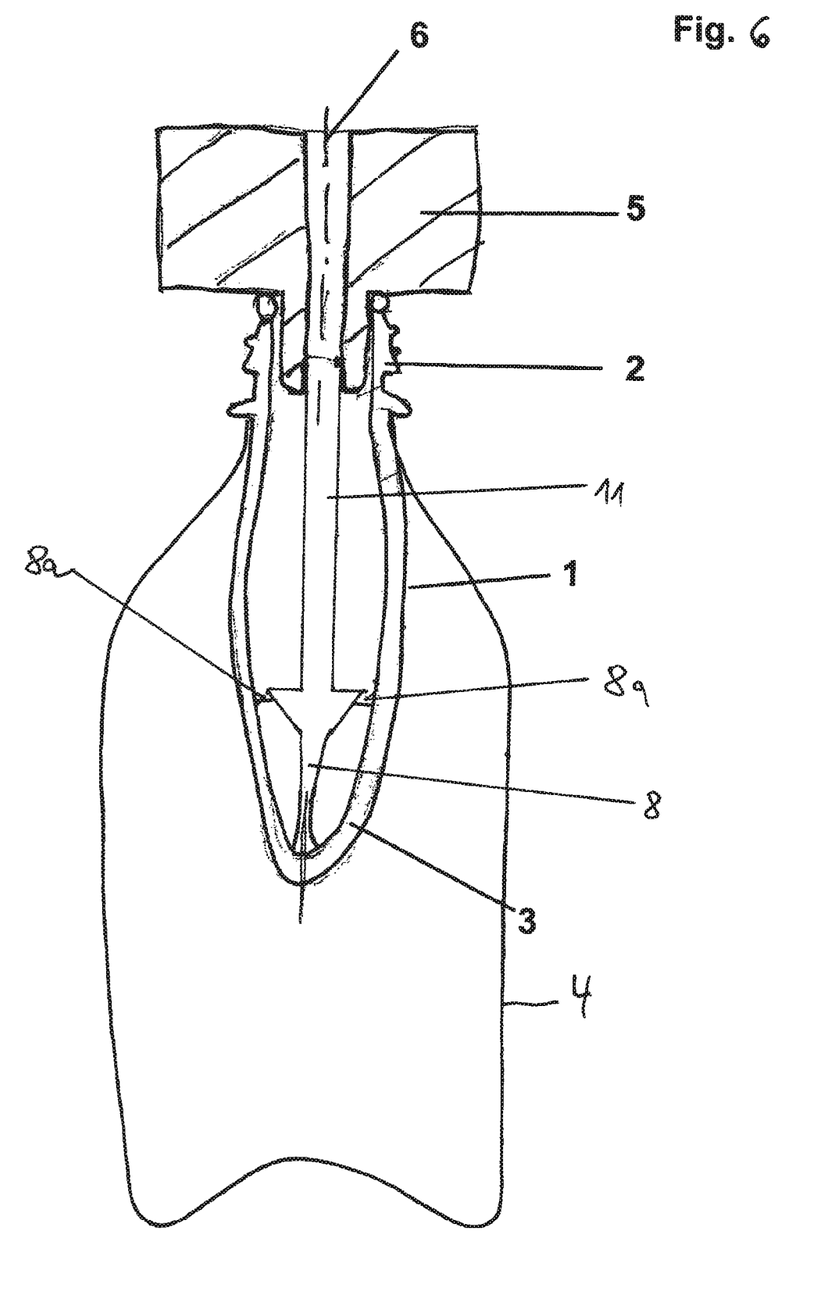
FIG. 6 shows the blank from FIG. 5 in the phase of the initiation of the stretching.

In FIG. 6, the blank 1 from FIG. 5 can be seen after initiation of the stretching procedure. The blank is already stretched both in the axial and in the radial direction. So that the nozzle 10 cannot be diverted laterally in the radial direction under the high pressure of the filling material jet 8 flowing out, the nozzle 10 has openings for lateral stabilization jets 8a, which support the nozzle with respect to the side wall of the blank and hold the nozzle in the centre of the blank 1 being shaped.

The invention claimed is:

1. A method for producing containers filled with a liquid filling material from blanks made of a thermoplastic material, comprising the steps of: thermally conditioning a respective blank; and shaping the blank in a mold during a shaping phase to form and fill the container by introducing liquid filling material under pressure through a nozzle into the blank to axially and radially stretch the blank, the axial stretching being initiated by a pulsed injection of filling material into the blank in a targeted manner against a base of the blank, the blank being stretched only by the liquid filling material.

2. The method according to claim 1, including supplying the filling material in an axial direction of the blank.

3. The method according to claim 1, including supplying the filling material to the blank at a speed of 30 to 100 m/s.

4. The method according to claim 3, including supplying the filling material at 70 to 90 m/s.

5. The method according to claim 1, including supplying the filling material with a jet diameter from 3 to 20 mm.

6. The method according to claim 5, including supplying the filling material with a jet diameter from 5 to 14 mm.

7. The method according to claim 6, including supplying the filling material with a jet diameter of 10 mm.

8. The method according to claim 1, wherein the filling material striking in pulsed injection in the blank exerts a force from 350 to 650N.

9. The method according to claim 8, wherein the filling material exerts a force from 400 to 600N.

10. The method according to claim 1, including changing a supply speed of the filling material during filling and shaping.

11. The method according to claim 10, including reducing the supply speed of the filling material during filling and shaping.

12. The method according to claim 1, including changing a jet diameter of the filling material during filling and shaping.

13. The method according to claim 1, including guiding the axial stretching at least temporarily by a guiding device that engages externally with the blank.

14. The method according to claim 13, including arranging the guiding device to partially enclose the blank or to interlock with the blank.

15. The method according to claim 13, wherein the guiding device limits axial stretching speed at least temporarily.

16. The method according to claim 1, including moving the nozzle axially during shaping.

17. The method according to claim 1, including detecting a position of the base of the blank at least temporarily during shaping using ultrasound or by detecting a thermal profile.

18. The method according to claim 17, including controlling distance between the nozzle and the base of the blank.

19. The method according to claim 16, including measuring pressure of the filling material or pressure in an exhaust air duct or a return flow line and regulating the movement of the nozzle during shaping by the measured values.

20. The method according to claim 1, including controlling the temperature of the filling material.

21. The method according to claim 20, including controlling the temperature of the filling material by heating the filling material.

22. The method according to claim 1, including maintaining a position of the nozzle so that the nozzle does not move laterally at least temporarily during shaping by filling material jets leaving the nozzle in a radial direction.

23. The method according to claim 1, wherein a cross-sectional surface of a head of the nozzle corresponds substantially to an inner cross-sectional surface of the blank.

24. A nozzle for use in a method according to claim 1, the nozzle comprising: an opening for a filling jet; and
further openings for auxiliary jets that run substantially at a right angle to the filling jet.

25. A nozzle according to claim 24, wherein the openings for the auxiliary jets are dimensioned so as to substantially offset forces resulting from the auxiliary jets.

* * * * *